Aug. 1, 1967 S. BERNSTEIN 3,334,231
PLATE THICKNESS MEASURING DEVICE WITH MEANS TO ADJUST
SOURCE VOLTAGE IN RESPONSE TO THICKNESS VARIATIONS
Filed June 25, 1964
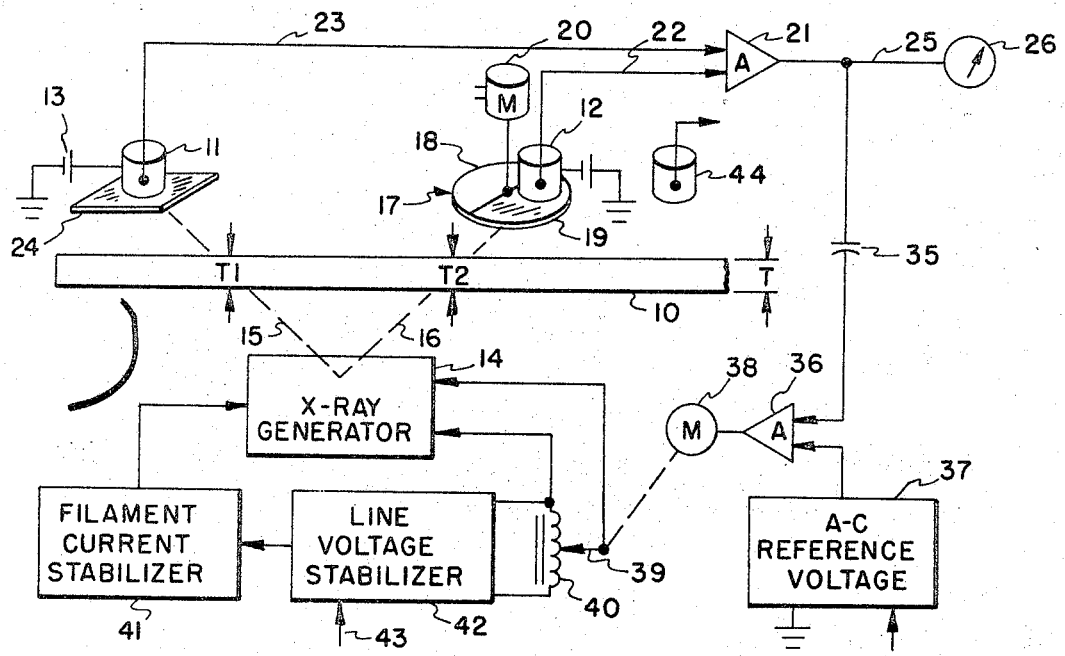
FIG. 1
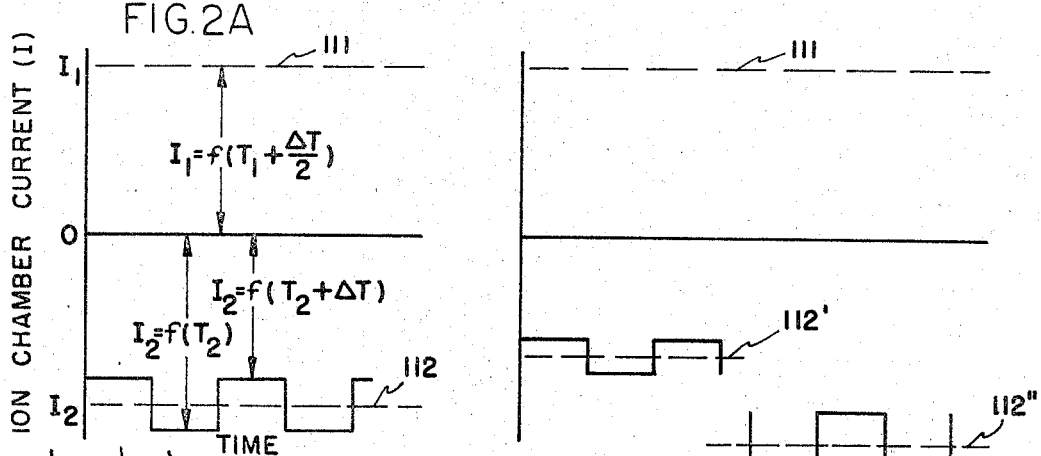
FIG. 2A
FIG. 2B
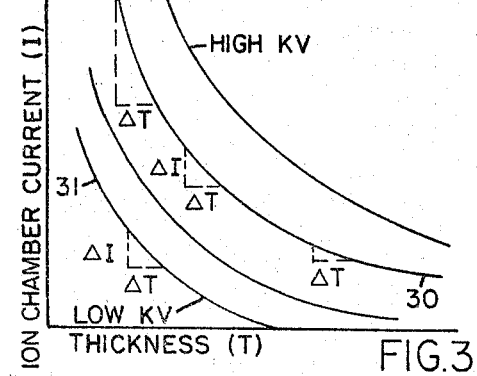
FIG. 3
INVENTOR.
STANLEY BERNSTEIN
BY Ralph L. Hohenfeldt
ATTORNEY

United States Patent Office

3,334,231
Patented Aug. 1, 1967

3,334,231
PLATE THICKNESS MEASURING DEVICE WITH MEANS TO ADJUST SOURCE VOLTAGE IN RESPONSE TO THICKNESS VARIATIONS
Stanley Bernstein, Shorewood, Wis., assignor to General Electric Company, a corporation of New York
Filed June 25, 1964, Ser. No. 377,903
4 Claims. (Cl. 250—83.3)

This invention relates to an X-ray gaging system for ascertaining cross-sectional profile of essentially planar workpieces such as plate that is being rolled to a desired thickness in a steel mill.

In connection with reducing metal plate in a rolling mill, it is known to use an X-ray gage for producing a thickness indicative signal which, through a servo system adjusts the screwdown of the rollers to maintain a desired thickness. Unless the gage is scanned across the sheet or unless a multiplicity of separate gages are used, no information concerning the profile of the sheet is obtained. This means that the sheet may be of proper thickness in a region where it is gaged but that it may be generally wavy, curved, or wedge-shaped so as to only approximate proper thickness in the ungaged regions.

A plate undergoing rolling usually moves back and forth at high longitudinal speeds so that transverse scanning does not yield accurate information about the profile directly across the plate. Placing several gages across the plate and comparing their outputs is also a generally unsatisfactory method of getting profile information because of the complexity and high cost of such systems. In addition, on any given rolling mill, as many X-ray sources would be required as are necessary to accommodate the widest workpiece in which case some of the sources and a corresponding number of detector systems might be inactive when narrow plate is run and some part of a significant investment would thereby be wasted. As a consequence of the foregoing technological and cost handicaps, gage systems that measure profile have not been used extensively, although a need therefor has often been stated.

Metal plate that is undergoing rolling may emerge from between the rollers with various profiles such as double concave, convex, wavy, and wedge-shaped. Or the plate may be curved lengthwise on some occasions. These conditions occur despite the fact that the upper and lower rolls are straight, parallel with each other, and have a uniform pressure over their length. From this it is evident that the cause of an abnormal profile developing may not reside in the mill in which the plate is last rolled, but it may arise in some preceding procedure which the plate has undergone, and it may be there that some change should be made.

Accordingly, the primary object of the present invention is to obtain information about the profile of a plate.

Other objects are to provide an X-ray profile gage system that has a minimum number of components, that responds rapidly to changing conditions, that obviates transverse scanning of the plate, that requires no consequential adjustments to accommodate plates of different widths and nominal thicknesses, and that is rugged, easy to use, and inexpensive.

Achievement of the foregoing and other objects will appear from time to time throughout the course of the ensuing specification.

The present invention features the use of pairs of X-ray detectors that are spaced from each other and are located on a common plane that is parallel with a plate the profile of which is to be determined. On the opposite side of the plate is one X-ray source for each pair of detectors. From a single point in the X-ray source, one ray or beam is directed through one part of the plate, and after being partially absorbed, is intercepted by one of the detectors on the other side of the plate. Another ray penetrates the plate in another region after which it is intercepted by the second detector in the pair. Intervening between the plate and the second detector is a rotating filter or chopper which passes essentially all of the radiation during one-half cycle and absorbs an incremental part during the next half-cycle. By this means an alternating current component is imposed on the output electric signal of the second detector which also has a D-C component.

The electric output signals from the first and second detectors are of opposite polarity and their D-C components effectively cancel each other if each ray is attenuated equally; that is, if the plate thickness is uniform. Each of the detector output signals is admitted to an amplifier that amplifies their D-C difference which is displayed on a meter that is calibrated to read deviation from noromal plate thickness. If one ray or beam encounters a different plate thickness, which means an irregular profile, the D-C signal from the amplifier will have a certain polarity and the meter deflects in one direction. Converse conditions cause opposite deflection and a uniform profile effects a null reading.

As indicated, the detector associated with the rotating chopper produces and A-C signal along with the D-C component. The A-C component passes through the amplifier and a blocking capacitor whereupon it is amplified and caused to drive a servo motor. The servo motor changes the voltage on the X-ray source to restore a unique balance condition. This is necessary because the current out of the detector that sees a thickness change will vary exponentially rather than linearly with thickness change. The X-ray source voltage change is such that an incremental current change with respect to an incremental thickness change is maintained constant throughout the operating range of the gage. It will be seen hereinafter that maintaining this constant relationship results in eliminating from the system the effects of line voltage variations, X-ray tube variations, marked changes in plate thickness and separation between the detectors which is tantamount to saying changes in the width of the plate.

A preferred embodiment of the invention will now be described in greater detail in conjunction with the drawing in which:

FIGURE 1 is a schematic representation of a differential X-ray profile gage embodying the invention;

FIGURES 2A and 2B show relationships between detector current and profile variations, for facilitating explanation of the invention;

FIGURE 3 is a plot of detector current versus plate thickness for various voltages on the X-ray source.

In FIGURE 1 is shown an end view of a plate 10 that is being subjected to profile measurement. The plate may be considered to be undergoing a sizing procedure as in a steel rolling mill in which case, it would be moved back and forth longitudinally on conveyor rollers while at the same time being subjected to pressure rollers, neither of which are shown. The plate may have a width two or more times greater than the depicted width in which case additional gaging systems like the one to be described are used. In any case, information on the profile of the plate is obtained by determining the relative thicknesses of different regions of the plate such as those designated T1 and T2. The thickness of interest is measured straight through the plate 10 rather than at a diagonal in the specified regions.

Immediately above plate 10 are a pair of X-ray detectors which are preferably ion chambers 11, 12. Oppositely polarized D-C sources such as a battery 13 are connected to each of the ionization chambers and this results in each of them producing output signals of opposite polarity in response to absorption of penetrating radiation.

Beneath plate 10 is an X-ray generator 14 which from a common point source projects a cone of radiation that includes a pair of diverging rays or beams 15, 16. These beams respectively penetrate plate 10 diagonally at which time they are attenuated to an extent depending on plate thickness. After passing through the plate, the beams are intercepted by ionization chambers 11, 12.

Intervening between plate 10 and chamber 12 is a chopper wheel or filter 17 that may constitute a ring having an open window 18 and a metal filter portion 19 which is preferably made of a metal that has the same metallurgical characteristics as plate 10. Chopper filter 19 may have a thickness equal to perhaps 5% of the thickness T of plate 10. For convenience, the thickness of filter 19 will be called delta T.

Chopper 17 is suitably carried on a shaft which is driven by a motor 20 that is preferably synchronous or of another type that has a stable speed characteristic. In this example, the motor rotates the chopper at ten cycles per second which results in the ion chamber 12 having a ten cycle A-C component together with a D.C. component. This current is supplied to a difference amplifier 21 by way of a conductor 22. As mentioned earlier, the D-C compouent of the current from ion chamber 12 will have a definite polarity.

Ion chamber 11 also produces a direct current output signal having an opposite polarity with respect to the D-C component from ion chamber 12. The D-C from ion chamber 11 is introduced into difference amplifier 21 by way of a conductor 23.

The additional thickness of absorber in ray 16 caused by chopper 19 would produce a different D-C signal in detector 12 than in detector 11 even when T1 and T2 are equal. Since the chopper absorber delta T is in the beam 16 only half the time, its effect may be compensated approximately in the other beam 15 by the addition of a compensating absorber 24 of thickness $\Delta T/2$. This approximation will be satisfactory in a practical sense as long as delta T is substantially less than T1 or T2.

If the plate has equal thickness at T1 and T2 the D-C components from chambers 11, 12 will be equal and opposite in which case there will be no D-C output from difference amplifier 21. If there is a thickness inequality, the difference between the components will be amplified and appear on conductor 25 as a D-C signal which may be used to operate a chart recorder, not shown, or be made to appear on a calibrated deviation meter 26. This meter is preferably one that centers at zero and deflects in opposite directions in dependence on the polarity of the current from difference amplifier 21 which relates back to difference in thickness of the plate at regions T1 and T2.

The D-C and A-C components referred to herein describe the effect of the chopper on the X-ray beam, and these components would be superposed on any fluctuations in the beam itself due to the means of generation. For example, if the voltage applied to the X-ray tube were pulsating, the D-C component referred to herein would be a steady-state pulsating signal, while the A-C component would actually be a modulated pulsating signal.

The character of the output currents from ion chambers 11, 12 is illustrated in FIGURE 2A. It is assumed that balanced conditions prevail; that is, T1 and T2 are equal. In such a case, the current $I_1$ from chamber 11 has a specific positive value as indicated by dashed line 111. $I_1$ is a function of $T_1+\Delta T/2$. It should be noted here that current from ion chamber 11 does not vary linearly with changes in plate thickness although linearity may be assumed within the small range of thickness variations, which may be only a few thousandths of an inch.

The current from ion chamber 12 varies cyclically with rotation of filter 19 and this variable current has a D-C component designated by reference numeral 112. When filter 19 is in beam 16, chamber current $I_2$ is a function of plate thickness T2 plus delta T. When the filter is not in the beam, $I_2$ is a function of T2 only. The fact that the ion chamber output currents are not linearly related is accounted for in connection with the X-ray beam 16 that produces $I_2$ as will now be explained.

Sequencing of filter plate 19 in the X-ray beam has the same effect as making a minor change in the thickness T2. The incremental thickness $\Delta T$ that is added by filter 19 produces a corresponding incremental current change $\Delta I$. Since the output indicator 26 will usually be calibrated in units of thickness, but is actuated by a signal derived from X-ray beam intensity or detector current I, it is necessary to maintain the factor $\Delta I/\Delta T$ constant for variations in other parameters such as thickness T, angle of X-ray beam with absorber, etc. The method of doing this is to vary the voltage on the X-ray generator of the correspondence with significant plate thickness changes and angle of the X-ray beam so that there will be a one-to-one relationship between $\Delta I$ and $\Delta T$ in relation to chamber 12.

In FIGURE 3 the ion chamber output currents are plotted against absorber thickness for various voltages on the X-ray generator. Of course, an infinite number of curves would be developed but for illustration purposes only a couple lying between the high and low kv. (kilovoltage) limits are shown. Ion chamber current I corresponds with percent transmission of penetrating radiation through an absorber and hence the curves follow the equation:

$$I = K_{i_x}^{i_o} = K_1 e^{-\mu X}$$

where K is a constant, I the ion chamber current, $i_o$ is the intensity of the original X-ray beam, $i_x$ is the transmitted intensity, $\mu$ is the co-efficient of X-ray absorption, X is the plate thickness, and $e$ is the natural logarithm base. $K_1$ is a second constant.

Attention is invited to one curve 30 in FIGURE 3. This curve is for one particular voltage that may be applied to X-ray generator 14. It will be noted that in the vicinity of the middle of the thickness range shown, $\Delta I$ is essentially equal to $\Delta T$. On the other hand, toward the right part of the curve it will be noted that in this region the same thickness $\Delta T$ results in a very small ion chamber current change. At the left of the curve, its slope is very sharp so that the same $\Delta T$ would produce a very large ion chamber current change. In order to maintain the same $\Delta I$ for $\Delta T$ at a new lower value of plate thickness T, it is necessary to shift to another kv. curve in the family. A region of desired linearity is found on a curve 31 that corresponds with a particular low kilovoltage on the X-ray generator 14. Broken lines define this region on curve 31.

The effect of a change in plate thickness also results from bringing detectors 11, 12 nearer or farther from each other in which case beams 15, 16 would penetrate the plate at a more or less acute angle. The greater or lesser absorbing thickness would in such a case result in a different value of $\Delta I/\Delta T$ from the ion chambers. The mechanism for supporting the ion chambers 11, 12, their filters 19, 24 and the motor 20 is not shown but its necessity should be clear as a result of the need for accommodating different plate widths in the gage system. The plane of rotating filter 19 is maintained parallel and at a constant distance with respect to the top surface of plate 10 and so is detector 11 and filter 24 for all distances between the ion chambers.

FIGURE 2B shows how the ion chamber currents are affected by increased and decreased thicknesses in the region of T2. Assuming that the thickness in the region of T1 remained the same, the current from ion chamber 11, designated $I_1$ would have the same value as in FIGURE 2A. The A-C wave from ion chamber 12 would have an average value or D-C component marked by the reference numeral 112′ if the plate is thicker in the region of T2. If the plate is thinner in this region, the D-C component 112″ would be more negative as is shown in FIGURE 2B. The different amplitudes of the A-C wave forms in FIGURE 2B demonstrate that the change in ion chamber current depends on whether thickness change is above or below nominal thickness. It may be restated that the amplitudes of the A-C wave forms in FIGURE 2B are indicative of ion chamber current changes $\Delta I/\Delta T$ and that it is desired to maintain this value constant, or for illustrative purposes, equal to the amplitude of the A-C wave form in FIGURE 2A.

In order to adjust the X-ray generator voltage so that a constant ratio is maintained between thickness and current changes, the A-C component of difference amplifier 21 is conducted through a blocking capacitor 35 which is in the input circuit of a difference amplifier 36. Another input to this amplifier is from an A-C reference voltage source which is symbolized by the block 37. The reference voltage has constant phase angle with respect to the A-C component from detector 12 so that when the latter varies, the amplitude difference is amplified and caused to operate a servo motor 38. The rotational direction of motor 38 depends on the polarity of the differential output signal from amplifier 36. Motor 38 is coupled with a slide arm 39 which is in circuit with an auto-transformer 40. Adjustment of arm 39 effects a voltage change on X-ray generator 14 which is in such direction as to return $\Delta I/\Delta T$ to its original constant value. In other words, the amplitude of the A-C wave is restored to that which it has in FIGURE 2A in the present illustrative example.

The A-C reference voltage produced by the source 37 may be variously generated. For instance, in a practical embodiment, a small generator, not shown, may be driven by chopper rotating motor 20 and the signal from such a generator may be introduced into amplifier 36 in which case it is assured that the phasing between the A-C wave form discussed above and the reference voltage will not shift. Those versed in the art will appreciate that the shape of the A-C wave form of the component from chamber 12 may be other than square as shown, depending on the configuration of chopper filter 19. A trapezoidal shape is most common.

The usual components of an X-ray generating system are present. For example, the filament current of the X-ray tube, not shown, is supplied from a stabilizer 41 which is energized from a line voltage stabilizer 42. The line voltage stabilizer may be connected to an alternating current power supply by a cable 43.

The profile gage described above may be used with others of the same kind, the number depending on the accuracy of the profile which is desired and the width of the plate which is being gaged. These gages are also used in conjunction with a conventional X-ray thickness gage for measuring nominal thickness T of the plate. A detector 44 for the nominal thickness gage is shown above and near the center line of plate 10. It may use a separate X-ray source which is omitted from the figure.

Although a preferred embodiment of the invention has been described in considerable detail, such description is to be considered illustrative rather than limiting, for the invention may be variously embodied and is to be limited only in accordance with the scope of the claims which follow.

It is claimed:
1. A gage for inspecting the thickness profile of a workpiece comprising:
   (a) a source of penetrataing radiation on one side of the workpiece,
   (b) a plurality of radiation detectors on the other side of the workpiece for producing electric currents that each depend on the rays from the source after penetration through different parts of the workpiece,
   (c) the difference between the currents being dependent on thickness variations between the parts and the change in detector current $\Delta I$ with respect to change in the thickness $\Delta T$ being dependent on the radiation from the source,
   (d) means for generating an electric signal that is representative of $\Delta I/\Delta T$ for a predetermined radiation from the source, and
   (e) means that respond to said last named signal generating means for adjusting the characteristics of the source to maintain $\Delta I/\Delta T$ substantially constant for a workpiece of any thickness within the range of the gage.
2. The invention set forth in claim 1 including:
   (a) a filter means of effective thickness $\Delta T$ that is cyclically interposed in the ray path to a detector means to thereby produce an A-C component $\Delta I$ in the current from one detector along with a D-C component,
   (b) said A-C and D-C components being variable with changes in the absorption path of the workpiece,
   (c) a servo system that is responsive to changes in the A-C component, and
   (d) a regulator for the penetrating radiation source which regulator is controlled by the servo system to control the source so as to maintain $\Delta I/\Delta T$ at a constant predetermined value for any absorption along the ray path.
3. An X-ray gage for inspecting the thickness profile of a workpiece comprising:
   (a) an X-ray generator on one side of the workpiece,
   (b) a source of voltage that is applied to the X-ray generator for producing an X-ray beam of certain intensity,
   (c) a pair of X-ray detectors that are spaced apart laterally of the workpiece and that produce respective electric currents one of which is solely D-C and the other of which has D-C and A-C components which depend on intensity of the X-rays from the generator after penetration through different parts of the workpiece,
   (d) a filter means that is adapted for cyclical movement in and out of the rays to one detector to thereby develop the said A-C component,
   (e) the thickness $\Delta T$ of said filter means being such as to produce a predetermined current change $\Delta I$ in the said other detector's output when the filter is in the rays that penetrate a part of the workpiece and the X-rays have said certain intensity in which case $\Delta I/\Delta T$ equals a constant,
   (f) means for isolating the A-C component,
   (g) means for comparing the A-C component with an A-C reference signal to thereby produce a difference signal that corresponds with any incremental relative thickness change in the workpiece parts,
   (h) and means that are responsive to the difference signal for changing the voltage on the X-ray generator until $\Delta I/\Delta T$ equals the same constant,
   (i) whereby the effects of unequal detector current changes for equal workpiece thickness changes are eliminated.
4. The invention set forth in claim 3 including:
   (a) means for comparing the D-C components and thereby producing a D-C difference signal the magnitude and polarity of which is indicative of the thickness difference between the parts of the workpiece.

References Cited

UNITED STATES PATENTS

| | | | |
|---|---|---|---|
| 2,723,350 | 11/1955 | Clapp | 250—103 X |
| 2,763,784 | 9/1956 | Webster | 250—83.3 |
| 3,179,800 | 4/1965 | McNamara | 250—83 |

RALPH G. NILSON, *Primary Examiner.*

S. ELBAUM, *Assistant Examiner.*